US011166418B2

(12) United States Patent
Xiong et al.

(10) Patent No.: US 11,166,418 B2
(45) Date of Patent: Nov. 9, 2021

(54) METHODS AND DEVICES FOR PRODUCING MUSHROOMS

(71) Applicant: Shaojun Xiong, Umeå (SE)

(72) Inventors: Shaojun Xiong, Umea (SE); Lars Atterhem, Burtrask (SE); Renyuan Huang, Umea (SE)

(73) Assignee: BioSteam AB, Burträsk (SE)

(*) Notice: Subject to any disclaimer, the term of this patent is extended or adjusted under 35 U.S.C. 154(b) by 0 days.

(21) Appl. No.: 17/259,185

(22) PCT Filed: Jul. 9, 2019

(86) PCT No.: PCT/SE2019/050681
§ 371 (c)(1),
(2) Date: Jan. 10, 2021

(87) PCT Pub. No.: WO2020/013756
PCT Pub. Date: Jan. 16, 2020

(65) Prior Publication Data
US 2021/0243968 A1 Aug. 12, 2021

(30) Foreign Application Priority Data

Jul. 11, 2018 (SE) .................... 1850883-8

(51) Int. Cl.
A01G 18/62 (2018.01)
A01G 18/69 (2018.01)
A01G 18/22 (2018.01)

(52) U.S. Cl.
CPC ............. A01G 18/62 (2018.02); A01G 18/69 (2018.02); A01G 18/22 (2018.02)

(58) Field of Classification Search
CPC ........ A01G 18/00; A01G 18/10; A01G 18/20; A01G 18/22; A01G 18/30; A01G 18/40;
(Continued)

(56) References Cited

U.S. PATENT DOCUMENTS 5,040,328 A * 8/1991 Coon .................... A01G 18/62
47/1.1
2013/0160356 A1* 6/2013 Hsieh .................... A01G 18/66
47/1.1

FOREIGN PATENT DOCUMENTS

EP 3387896 A2 * 10/2018 ............. A01G 18/70
JP 07155058 A 6/1995
(Continued)

OTHER PUBLICATIONS

Nordlinder, Johanna, International Search Report for PCT/SE2019/050681, ISA/SE, dated Nov. 9, 2019, 4 pages.
(Continued)

Primary Examiner — Monica L Barlow
Assistant Examiner — Aaron M Rodziwicz
(74) Attorney, Agent, or Firm — Cafardi, Ferguson, Wyrick, Weis & Gabriel, LLC; Andrew M. Gabriel

(57) ABSTRACT

The present invention relates to a method of producing mushrooms, comprising the steps of: i) providing a tray having a first surface and an opposite second surface and comprising a plurality of depressions in the first surface, the inner surfaces of the depressions defining receptacles open to the first surface for holding a mushroom growth medium and the outer surfaces of the depressions defining protrusions extending out from the second surface, ii) filling each receptacle at least partially with a mushroom growth medium, iii) applying a foil or sheet to the first surface so as to close each receptacle, iv) pasteurizing the mushroom growth medium, v) inoculating the growth media with mushroom spawn by injecting the mushroom spawn through the foil or sheet into the mushroom growth medium, vi) incubating the growth medium for allowing a mushroom mycelium to form in the mushroom growth medium, vii) at least partially removing or opening the foil or sheet above the receptacles to allow mushrooms to grow to protrude (Continued)

Figure 1A:
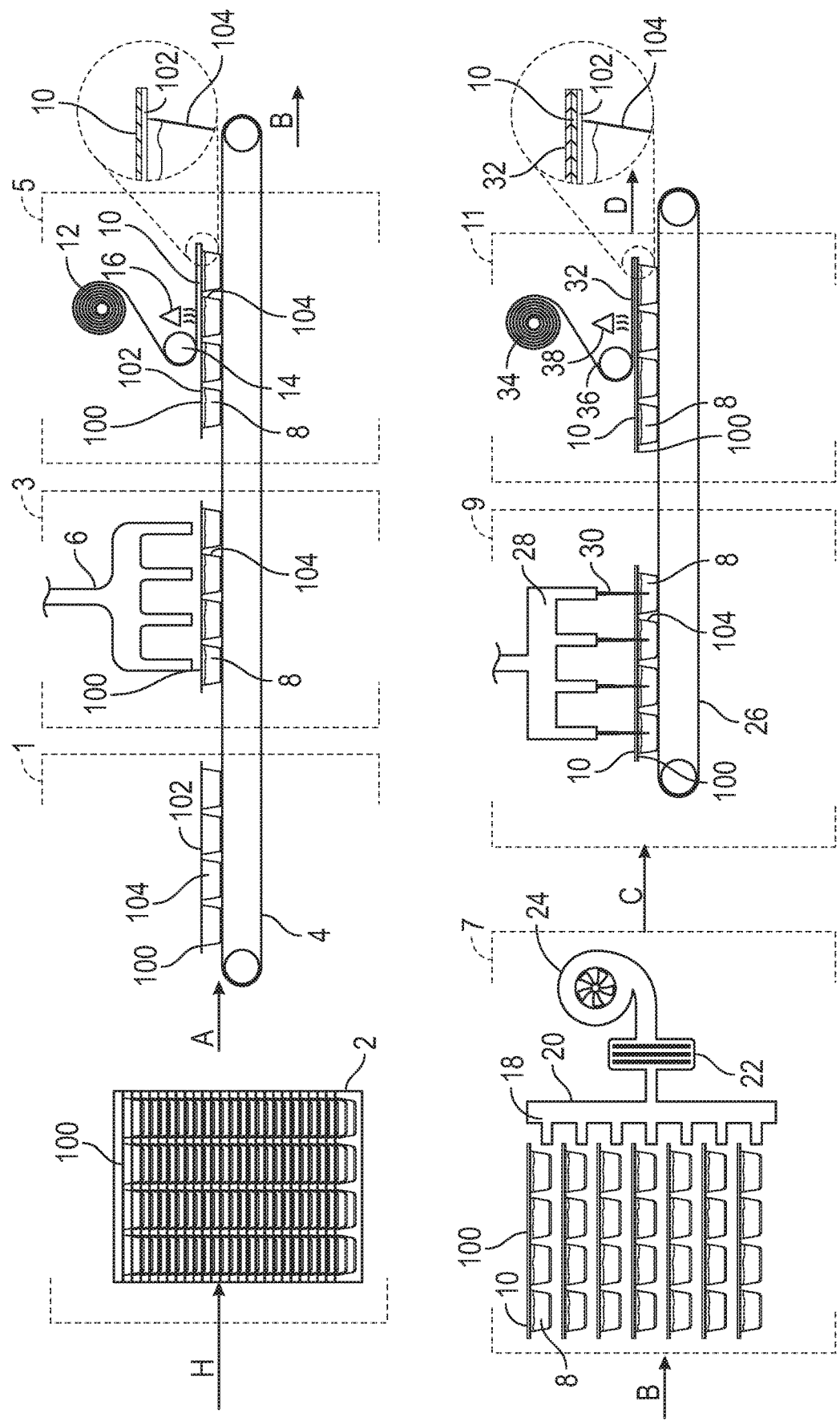

from the first surface, and viii) harvesting the mushrooms. The present invention further relates to a device for producing mushrooms.

13 Claims, 10 Drawing Sheets

(58) Field of Classification Search
CPC ........ A01G 18/50; A01G 18/60; A01G 18/62; A01G 18/69
See application file for complete search history.

(56) References Cited

FOREIGN PATENT DOCUMENTS

| | | |
|---|---|---|
| JP | 1028472 A | 2/1998 |
| JP | 2001190151 A | 7/2001 |
| JP | 2005110547 A | 4/2005 |
| JP | 2008228674 A | 10/2008 |
| KR | 20010091648 A | 10/2001 |
| KR | 200451877 Y1 | 1/2011 |

OTHER PUBLICATIONS

Nordlinder, Johanna, Written Opinion of the International Searching Authority for PCT/SE2019/050681, ISA/SE, dated Nov. 9, 2019, 6 pages.

* cited by examiner

METHODS AND DEVICES FOR PRODUCING MUSHROOMS

FIELD OF THE INVENTION

The present invention relates to the field of mushroom production. In particular the present invention relates to a method for mushroom production in which a plurality of receptacles in a tray are filled with a mushroom growth medium, the tray thereafter being covered by a foil or sheet to seal the receptacles during pasteurization or sterilisation of the growth medium, whereafter the growth medium is inoculated with mushroom spawns/inoculum. The present invention further relates to a device comprising the tray and the foil or sheet for use in the method.

BACKGROUND OF THE INVENTION

Edible fungi are often protein-rich. Mushroom oyster (*Pleurotus* sp.) and shiitake (*Lentinula edodes*) can have as high as 30% and 21%, respectively, protein content of dry mass (USDA 2017). Edible mushrooms further contain components that can be used for medication and health care. In addition the cultivation of Shiitake mushroom has been considered as a biological pre-processing for biofuel production, because shiitake mushroom, being a type of white-rot fungi, has an ability to degrade lignin in the substrate (e.g., forest or agro-crop residues, or other biogenic by-products, etc.) where it grows, thus the use of shiitake cultivation as a pre-processing step could potentially replace existing thermal-chemical pre-treatment that make up more than 30% of the costs for cellulosic ethanol production today.

However, technological developments are needed to find sustainable solutions for an integration of edible mushroom and biofuel production and for further market development of edible mushrooms.

The typical mushroom production process typically involves a number of steps starting with the step of preparing a suitable growth medium or substrate for the mushrooms to grow on (substrate processing). In a second step this growth medium is placed in a container such as a bag or jar (bagging). In the third step the bag or jar is heated to pasteurize the growth medium (pasteurization/sterilization), whereafter, in the fourth step, the growth medium is inoculated with mushroom spores (inoculation). In a fifth step the inoculated growth medium is incubated (incubation), and in the sixth step fruitification occurs and the mushroom body grows (de-bagging and fruitification). This is followed by a seventh step of harvesting the mushroom body (harvesting). After these steps the waste, i.e. the spent growth medium with mycelium, is discarded. Today, shiitake and oyster mushroom have a price of about 150-200 Swedish krona/kg (fresh, with moisture content 70-90%) in the Swedish market, which is expensive. The present inventors estimate that 40-45% of the production costs of these mushrooms are due to manual labour work such as bagging (i.e. filling plastic bags with the growth medium) and de-bagging (removing or opening the plastic bag before or in connection with fruitification). Also, the energy consumption for pasteurization is high and therefore involves significant costs; the bags have to be large in order to reduce the manual workload of bagging and de-bagging, i.e. in order to reduce the number of bags that need be manually handled, which leads to long pasteurization times (at least 6-8 hours for a cylindrical bag with a 11 cm diameter) if the core temperature in the growth medium in the bag shall reach the required temperature for the required time. Furthermore, the high amount of manual labour involved increases the risks of spreading and cross contamination of harmful and airborne microorganisms, which can decrease mushroom production and spread disease.

In addition to the above disadvantages the plastic bags are often rendered unusable, when opened or removed, for reuse, thus causing unnecessary waste of resources and possible harm to the environment.

Accordingly, it is an object of the present invention to provide devices and methods for mushroom cultivation which allow the cultivation to be at least partly automated and/or by which the amount of manual labour involved in the cultivation of mushrooms may be decreased.

It is a further object of the present invention to provide devices and methods for mushroom cultivation whereby the time needed for pasteurization or sterilization to be decreased.

It is a further object of the present invention to provide devices and methods for mushroom cultivation which decreases the risk of spreading and cross contamination of harmful and airborne microorganisms during the cultivation.

It is yet a further object of the present invention to provide devices and methods for mushroom cultivation whereby the amount of resources needed for the cultivation is decreased and/or harm to the environment is at least partly prevented.

SUMMARY OF THE INVENTION

At least one of the above objects, or at least one of the objects which will be evident from the below description, is according to corresponding first and second aspect of the invention achieved by a method of producing mushrooms, comprising the steps of:

i. providing a tray having a, preferably generally planar, first surface and an opposite second surface and comprising a plurality of spaced apart depressions in the first surface, the inner surfaces of the depressions defining receptacles open to the first surface for holding a mushroom growth medium and the outer surfaces of the depressions defining protrusions extending out from the second surface, ii. filling each receptacle at least partially with a mushroom growth medium, and iii. closing each receptacle by applying a foil or sheet to the first surface, iv. pasteurizing or sterilizing the mushroom growth medium, preferably by applying a pasteurization or sterilisation heating medium, such as heated gas such as heated air, to the tray such as by allowing the heating medium to pass between the protrusions of the receptacles on the second surface of the tray, v. inoculating the growth media with mushroom spawn by injecting the mushroom spawn through the foil or sheet into the mushroom growth medium, vi. incubating the growth medium for allowing a mushroom mycelium to form in the mushroom growth medium, vii. at least partially removing or opening the foil or sheet closing the receptacles to allow mushrooms to grow and protrude from the receptacles and from the first surface, and viii. harvesting the mushrooms, and a device for producing mushrooms, the device comprising:

a tray having a, preferably generally planar, first surface and an opposite second surface and comprising a plurality of depressions in the first surface, the inner surfaces of the depressions defining receptacles open to the first surface for holding a mushroom growth medium and the outer surfaces of the depressions defining protrusions extending out from the second surface, the tray preferably being made of a non-transparent plastic such as polypropylene, a mushroom growth medium provided in the receptacles, the mushroom growth medium preferably being pasteurized or sterilised, and a foil or sheet applied to the first surface so as to close each receptacle.

Thus the present invention is based on the realization that mushroom cultivation can be rendered efficient and automated provided a suitable device for housing the mushroom growth medium can be realized, and on the realization that a sheet or foil can efficiently be used to prevent cross contamination of harmful and airborne microorganisms during the cultivation. The combination of tray and sheet allows the automation of the closing of the receptacles in contrast to earlier used manual bagging, and the tray can be reused, in contrast to plastic bags, thus preventing unnecessary waste of resources. At the same time the comparably thin material that can be used for the tray, i.e. for the receptacles of the tray, provide a high rate of heat transfer thus allowing the time needed for pasteurization or sterilization to be decreased.

In the context of the present invention "producing" is to be understood as encompassing any of growing, cultivating, and farming.

The steps of the method according to the present invention should be performed in the order indicated.

The tray may be provided from a stack of trays.

The first surface is preferably generally planar. The first surface may for example be planar except for a raised or reinforced circumferential edge. The first surface and the tray is preferably rectangular having a length of 30-100 cm, such as 40-70 cm, and a width of 20-60 cm, such a 30-50 cm. The diameter of the receptacles at the opening in the first surface is preferably 5-20 cm, such as 8-12 cm or 10 cm, and the depth of the receptacles may be from 5-20 cm such as 8-12 or 10 cm. The thickness of the tray, i.e. the distance between the first and second surfaces at a position between the receptacles, may be from 0.1 to 10 mm, such as from 0.5 to 5 mm.

The tray is preferably made of a plastic, such as a transparent plastic. The tray may for example be made of polypropylene. The tray may alternatively for example be made of polystyrene.

The tray may be made from transparent plastic. Alternatively the tray is made from a non-transparent plastic.

More preferably the tray, or at least the receptacles, is made from a non-transparent plastic, or the tray or at least the receptacles are coloured, painted or otherwise covered with non-transparent material, so that light cannot enter the receptacles through the side walls or bottom. This helps ensure that the mushroom mycelium and/or the mushrooms (fruit bodies) grow and/or develop towards the first surface. The tray may be made by moulding a plastic sheet, or by injection moulding. The opposite second surface is opposite to the first surface.

The plurality of spaced apart depressions may comprise 4 to 60 depressions, such as 8 to 20, preferably from 8 to 12. The depressions should be spaced apart at least 1 cm, such as 2 cm, and less than or equal to the diameters of the depressions/receptacles. Typically the receptacles may be aligned in two rows. The inner surfaces of the depressions may comprise inner walls and/or an inner bottom.

The receptacles are defined by inner surfaces, i.e. the inner walls and bottom of the depressions. The depressions, i.e. the receptacles, may for example be formed frustoconically, conically, cylindrical, with a square or rectangular cross section. Generally a frustoconical, i.e. shaped like a flower pot, or cylindrical shape, or a square cross section, is preferred.

The receptacles are open to the first surface, thus the interior of the receptacles are accessible through the opening of the depressions.

On the second surface protrusions are formed corresponding to the depressions in the first surface. These protrusions thus correspond to the outer walls of the receptacles. The filling of the receptacles with mushroom growth medium is dependent on the type of growth medium. Liquid, gel-like or paste-like growth medium may be dispensed or poured from a tap or nozzle into the receptacles. Solid growth medium may be dispensed to fall into the receptacles from hopper or funnel filled with growth medium from a transport screw or conveyor.

In the context of the present invention mushroom growth medium is to be understood as encompassing mushroom growth substrate. A mushroom growth medium may be any substance on, or in, which mushroom mycelium can grow.

Mushroom growth medium may comprise wood such as sawdust, straw such as wheat, rye, oat, other crop residues such as cottonseed hull, corn cob, and wheat bran, cardboard, etc.

Preferably the whole receptacles are filled with the mushroom growth medium.

Closing each receptacle comprises that each receptacle is sealed off from outside the tray so that microorganisms cannot enter the receptacles from outside the tray, however in certain cases the individual receptacles may be in communication with each other within the tray. Accordingly the foil or sheet will at least prevent microorganisms from entering the receptacles from outside the tray. Preferably the sheet or foil should also prevent water from evaporating from the growth medium and pass out of the receptacles. The foil or sheet may however be selected so as to allow air to pass through.

The receptacles are closed by the foil or sheet. In other words there is no other closing member than the foil or sheet closing the receptacles.

The foil or sheet may comprise aluminium or other metal foil, a plastic foil or sheet, such as a transparent plastic sheet or film, such as PVC or LDPE, or sheet of another material such as a paper or cardboard sheet. In order to close the receptacles the foil or sheet must at least contact the edges of the tray. Preferably the foil or sheet contacts the entire first surface of the tray.

The foil or sheet should preferably cover the entire first surface.

Preferably the sheet is transparent.

It is further contemplated that the foil or sheet may be a reusable sheet that is slid into place to close the receptacles. Accordingly opposite edges of the first surface of the trays may comprise opposite grooves facing the center of the tray, into which grooves opposite edges of the reusable sheet enters so that the sheet can be slid over the first surface of the tray to cover the receptacles. This can be obtained by bending, or otherwise forming, the opposing edges so that they are folded back on themselves, thus creating a groove. Alternatively two opposite edges of the reusable sheet may be folded or otherwise formed to define two inwardly facing grooves into which two opposing edges of the tray can fit to allow the reusable sheet to be slid on and off the tray. The reusable sheet should be sufficiently rigid to allow it to be pulled or pushed long the grooves to cover the first surface. The reusable sheet preferably comprises a plurality of ports corresponding to the respective receptacles for allowing the inoculation of the mushroom spawn through the sheet. Each port may for example comprise any of an area where the thickness of the sheet is reduced to allow puncture by a needle, a hole in the sheet covered by a foil or sheet made of the materials described above, a filter material such as paper, or covered by a rubber film or rubber septa. The reusable sheet is preferably made from plastics, preferably a transparent plastic. It is further contemplated that the sheet could be slid to the side during inoculation to allow access to the receptacles.

Pasteurizing or sterilizing the mushroom growth medium has the purpose of killing any microorganisms or other plants or other mushrooms or mycelium present in the growth medium so that the mushroom spawn, once inoculated into the growth medium, should not have to compete with other microorganisms.

The pasteurization or sterilisation heating medium may be heated gas such as heated air, however it is also possible to use steam or heated water.

The heating medium should pass between the protrusions so that the heat of the heating medium can be efficiently transferred to the protrusions and therefrom through the outer walls of the receptacles into the growth medium Inoculating the growth media with mushroom spawn comprises providing a mushroom spawn in the growth medium in the receptacles.

The mushroom spawn is preferably provided in liquid solution and injected by a syringe piercing the sheet or foil. Alternatively the mushroom spawn may be provided as a solid particle or collection of cells. In this case the mushroom spawn may be injected by being provided on the tip of a needle or the like which pierces the sheet or foil.

Optionally the holes left in the foil or sheet from the injection can be closed by applying a further layer of sheet or foil onto at least the holes, but preferably the over the entire first surface. It is also possible to put filter patches, i.e. patches made of a filter media such as paper, over the holes. The filter patches can allow air exchange but do not allow water and microorganism through.

Allowing air exchange provides a faster growth and higher yield. It also reduces accumulation of carbon dioxide in the receptacles.

Incubating the growth medium may comprise maintain the tray and device at a suitable temperature for mushroom mycelium to form in the mushroom growth medium.

In order that mushrooms should grow from the mycelium the sheet or foil needs to be at least partially removed or opened at least above the receptacles. This may be done by cutting at least one slit in the sheet or foil, cross-cutting two perpendicular slits and folding away the triangular flaps formed by the cutting, punching out a part, such as a circular part, of the foil or sheet, or by removing the whole sheet or foil altogether.

Thus mushrooms will then grow from the mycelium in the receptacles, out of the receptacles and protrude from the receptacles and the first surface.

Harvesting the mushrooms may involve separating the mushrooms from the mushroom mycelium in the growth medium in the receptacles.

When producing shiitake it is preferable to remove all of the sheet or foil closing the receptacles. When producing oyster mushroom it is preferably to cut one or more slits in the sheet or foil, such as cross-cutting two perpendicular slits.

In some embodiments of the method and device according to the first and second aspects of the present invention the receptacle are fluidly interconnected by troughs in the first surface defining channels extending between the receptacles. Preferably the channels fluidly interconnect adjacent receptacles. This allows the mushroom mycelium in one receptacle to grow into another receptacles and it also allows mushroom growth medium to pass from one receptacle to the other, thus providing for simple filling of the receptacles when a liquid of pourable mushroom growth medium is used, which mushroom growth medium need only be filled into one or a few receptacles, by one or a few nozzles or taps, wherefrom the growth medium will flow into the other receptacles.

The channels may have a depth (from the first surface) of 0.3-1 times the depth of the receptacles, and a width of 0.1 to 0.3 times the width of the receptacles. Channels may preferably be used in trays for producing shiitake.

For producing oyster mushroom it is generally preferred that the receptacles are not fluidly interconnected by channels extending between the receptacles.

In some embodiments of the method according to the first aspect of the present invention step iii of closing each receptacle comprises heating the foil or sheet and/or the first surface to partially melt the foil or sheet to cause it to adhere to the first surface, or, alternatively step iii of closing each receptacle comprises using an adhesive applied to the foil or sheet and/or to the first surface.

Correspondingly, in some embodiment of the device according to the second aspect of the present invention the receptacles are closed by heating the foil or sheet and/or the first surface to partially melt the foil or sheet to cause it to adhere to the first surface, or alternatively by an adhesive applied to the foil or sheet and/or to the first surface. The use of heating is advantageous as it provides a simple solution of applying the foil or sheet. On the other hand adhesives may be used for sheets or foils which do not melt or require higher temperatures than the tray can withstand.

The sheet or roll may for example be positioned on the first surface after which a heating element is presses and heats the foil or sheet towards the first surface to cause it to adhere thereto.

Alternatively one side of the foil or sheet can be heated by a heater whereafter this side is pressed against the first surface of the tray.

Alternatively, or additionally the entire tray is heated and the foil or sheet is pressed or drawn against the first surface.

In the case of an adhesive, this may be applied to the foil or sheet, or more preferably, to the first surface of the tray.

In some embodiments of the method according to the first aspect of the present invention step viii of harvesting the mushrooms comprises moving a knife parallel with, and along, relative to the first surface to sever at least a major part of the mushrooms protruding from the first surface from a minor part of the mushrooms in the receptacles and/or from the mycelium in the mushroom growth medium.

The knife may comprise knife blade with a knife edge, or alternatively a steel wire (0.05 to 1 mm ("piano string"). The knife or wire may be held stationary and the device moved relative to it, or vice versa. Preferably the knife or wire is positioned at least 1 mm, such as 5 mm, above the first surface. A collecting surface or wiper blade may be combined or arranged next to the knife to direct the harvested mushrooms to a site where they can be collected.

Alternatively, depending on the mushroom variety, a blunt knife or a blunt edge may be used to break off the mushrooms from the mycelium.

In some embodiments of the method according to the first aspect of the present invention the method further comprises the step of:

ix. removing, after step viii of harvesting, the growth medium with the mycelium from the receptacles of the tray, for example by applying a force on the growth medium such as a physical force or by blowing a gas or spraying a liquid, and reusing the tray in step i.

This is advantageous in that it allows the tray to be reused. In addition to the mushroom growth medium and the mushroom mycelium, also the sheet or foil may be removed and recovered for recycling in this step.

In some embodiments of the device and method according to the aspects of the present invention the second surface and/or the projections further comprise guiding vanes, fins or the like, for guiding the pasteurization or sterilisation heating medium, such as heated gas such as heated air, towards the projections and/or for increasing the surface area of the projections to increase the rate of heat transfer from the pasteurization or sterilisation heating medium to the receptacles.

This is advantageous in that it decreases the time needed for pasteurization or sterilisation of the mushroom growth medium In some embodiments of the device and method according to the aspects of the present invention the bottom of each receptacle is made up of a foil or sheet attached to the second surface and/or the protrusions extending out of the second surface. This allows the tray to be made in a simple way where each receptacle is initially open in both ends whereafter a sheet or foil is attached to the second surface and/or the protrusions to close the bottom end of the receptacles, such tray may take less space when stored, and may further be easier to purge of spent mushroom growth medium and mushroom mycelium by removing or puncturing the sheet or foil making up the bottom of the receptacles whereafter the spent mushroom growth medium and mushroom mycelium can be pressed out of the receptacles along a single direction.

In some embodiments of the method according to the first aspect of the present invention two trays are provided in step i, the method further comprising the steps of:

x. arranging and fastening the two trays back to back in pairs with their first surfaces facing away from each other,
 a. wherein the bottoms of the receptacles of a first one of the trays contact the bottoms of the receptacles of a second one of the trays, or alternatively,
 b. wherein either the alignment of a first one of the trays in respect to a second one of the trays, or the positions of the receptacles on the first surface of a first one of the trays in relation to the positions of the receptacles on the first side of a second one of the trays, in combination with the dimensions of the receptacles, are configured so that the projections of the first one of the two trays extend between the projections of the second one of the two trays and vice versa, and preferably so that the projections of the first one of the two trays contact the second surface of the second one of the two trays and vice versa, and wherein each of the steps ii to viii, and preferably also step ix, is performed on both of the two trays sequentially, or preferably simultaneously.

Correspondingly, in some embodiments of the device according to the second aspect of the present invention two trays are arranged back to back, with their first surfaces facing away from each other and wherein the bottoms of the receptacles of a first one of the trays contact the bottoms of the receptacles of a second one of the trays.

Alternatively, in other embodiments of the device according to the second aspect of the present invention two trays are arranged back to back, wherein either the alignment of a first one of the trays in respect to a second one of the trays, or the positions of the receptacles on the first surface of a first one of the trays in relation to the positions of the receptacles on the first side of a second one of the trays, in combination with the dimensions of the receptacles, are configured so that the projections of the first one of the two trays extend between the projections of the second one of the two trays and vice versa, and preferably so that the projections of the first one of the two trays contact the second surface of the second one of the two trays and vice versa.

This is advantageous in that it utilizes the fact that many mushroom varieties can grow more or less horizontally, i.e. they can grow out of a vertical surface. This makes it possible to better utilize space in for example a sterilisation or pasteurisation chamber, an incubation chamber, and a fruitification chamber, i.e. an enclosure in which pasteurisation, incubation or fruitification takes place.

The trays are preferably arranged back to back after the inoculation step, after the receptacles have been close, i.e. immediately before or after the pasteurization or sterilisation step.

The trays may be fastened together by adhesive, by wrapping them with sheet or foil, or by interlocking structures, such as structures locking together by snap-fit or interference fit.

For an especially close arrangement of the trays the projections of the first one of the two trays should extend between the projections of the second one of the two trays and vice versa. This requires that the depressions/receptacles are spaced sufficiently far apart, i.e. the positions of the receptacles on the first surface of a first one of the trays and the positions of the receptacles on the first surface of a second one of the trays should be so configured. The trays may have identical positioning of the receptacles, in which case the trays must be displaced in the plane of the first surfaces relative to each other, i.e. at least one of the edges of the trays, if the trays are identical, will not line up with each other. Alternatively the position of the receptacles in the respective trays may differ between the two trays, i.e. there being provided a first tray with a first positioning of the receptacles and a second tray with a second positioning of the receptacles, which two trays can be arranged with the projections of one tray extending between the projections of the other tray while at the same time the edges of the two trays line up with each other.

This is also advantageous in that it can doubles rate by which the trays are handled in the method, provided the steps of the method are carried out on both trays simultaneously.

In some embodiments of the method and device according to the aspects of the present invention the foil or sheet that is attached to the respective first surfaces of the two trays further extend between the two trays to keep them arranged back to back, with their first surfaces facing away from each other.

This is advantageous in that it provides an efficient solution to the problem of how to close the receptacles and how to keep the trays arranged back to back.

In alternative embodiments the trays are held together by a sheet or foil that is separate from the sheet or foil closing the receptacles, plastic or metal clips, plastic or metal wires, tape, adhesives etc. The trays may further for example be held together by snap fit interconnections, such as by providing the guide vanes or fins, or the edges of the trays with snap-fit hooks allowing two trays to be pushed together whereby the hook of the respective trays engage each.

In some embodiments of the method according to the first aspect of the present invention two trays are provided in step i, the two trays being formed integrally with each other whereby each receptacle of a first one of the two trays is in fluid communication with a corresponding receptacle of a second one of the two trays, and wherein each of the steps ii to viii, and preferably also step ix, is performed on both of the two trays sequentially, or preferably simultaneously.

Correspondingly, in some embodiments of the device according to the second aspect of the present invention two trays are formed integrally with each other and wherein each receptacle of the first one of the two trays is in fluid communication with a corresponding receptacle of the second one of the two trays.

Accordingly in these embodiments the two trays are arranged back to back and formed integrally with each other. The receptacles may be in fluid communication with each other by means of an aperture in the bottoms of the respective receptacles. The aperture preferably has a diameter that is the same as the diameter of the respective receptacles at their bottoms. The trays may thus for example comprise two first surfaces facing in the opposite directions, two second surfaces facing towards each other, and tubes extending between the second surfaces and being open to the first surfaces for establishing fluid communication between the first surface of a first one of the trays and the first surface of a second one of the trays, these tubes defining common depressions in the respective first surfaces whose inner surfaces define common receptacles. Thus the tubes may have a uniform diameter along their length, or alternatively the tubes may taper having their smallest diameter at a position between the two second surfaces.

BRIEF DESCRIPTION OF THE DRAWINGS AND DETAILED DESCRIPTION

Figure 1B:
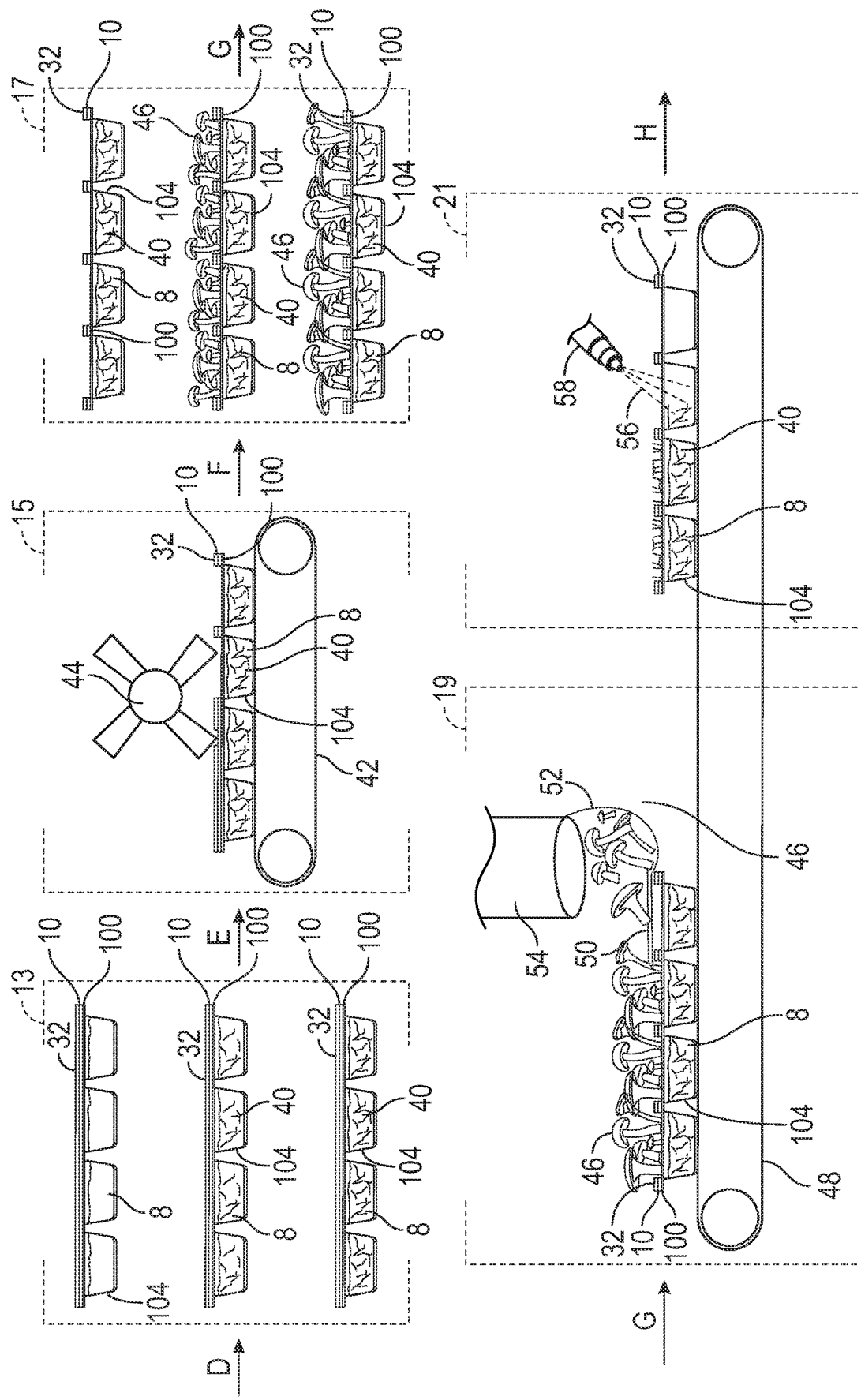
Figure 1C:
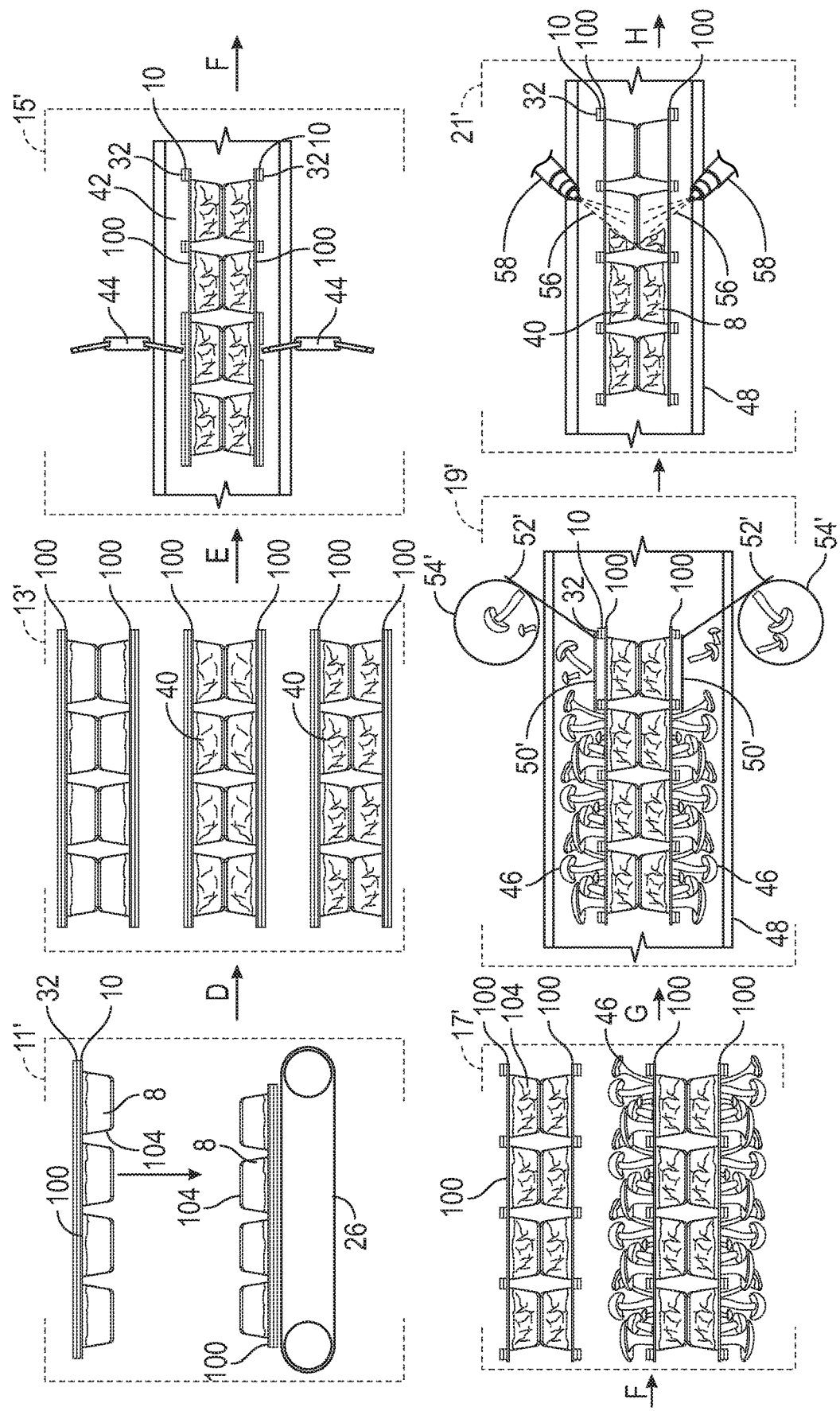
Figure 2A:
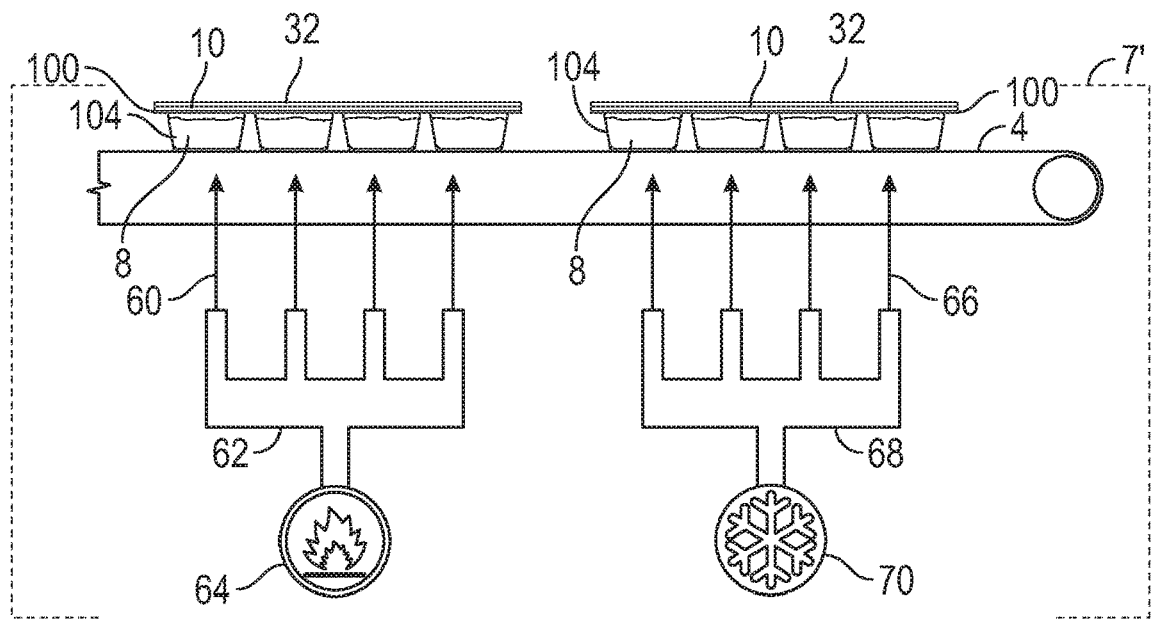
Figure 2B:
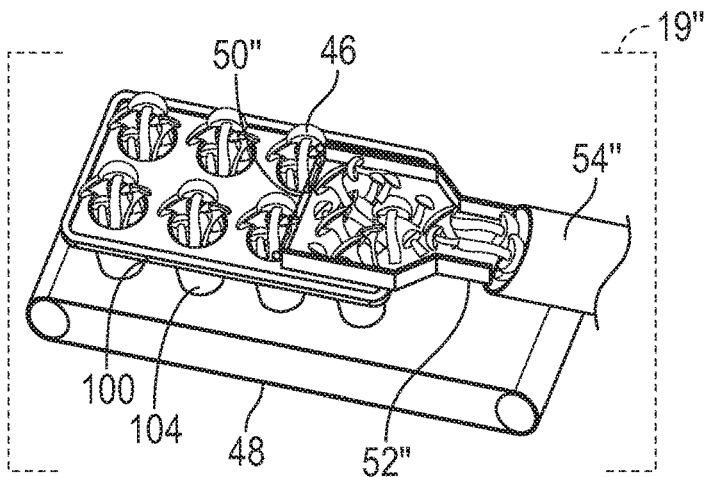
Figure 2C:
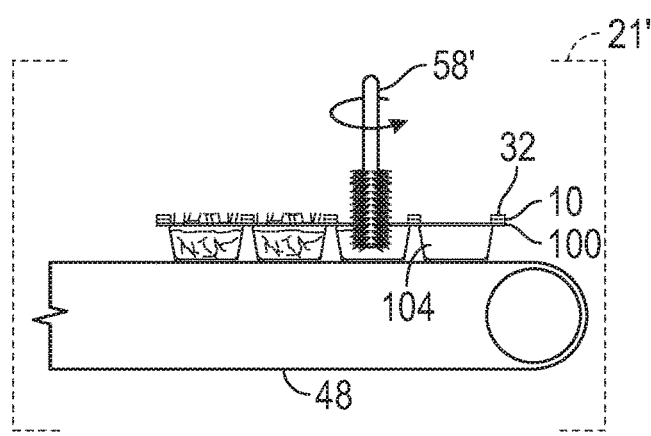
Figure 3A:
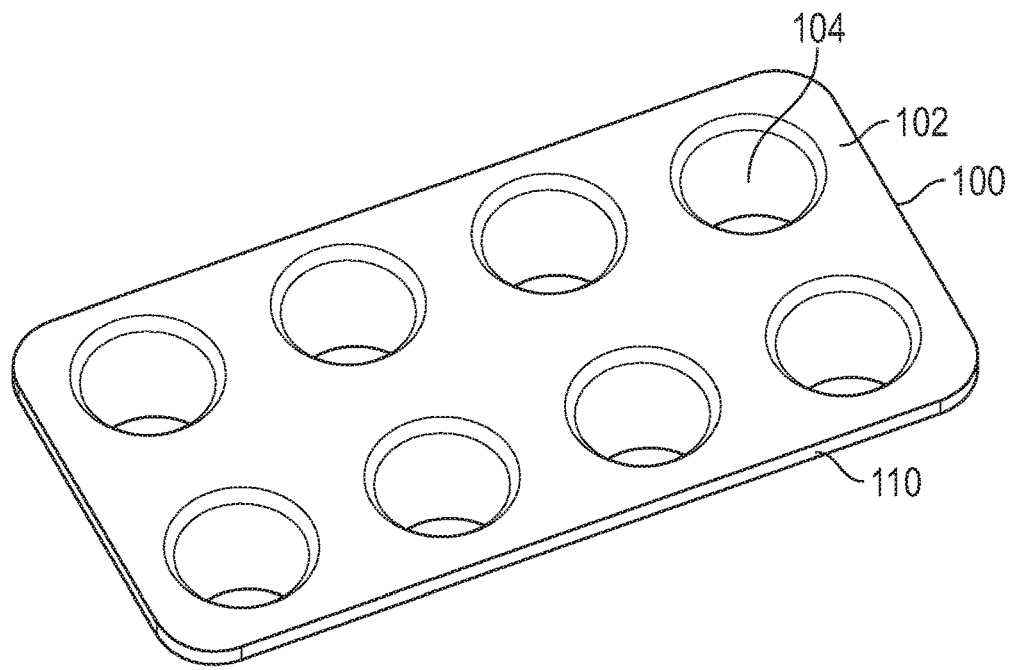
Figure 3B:
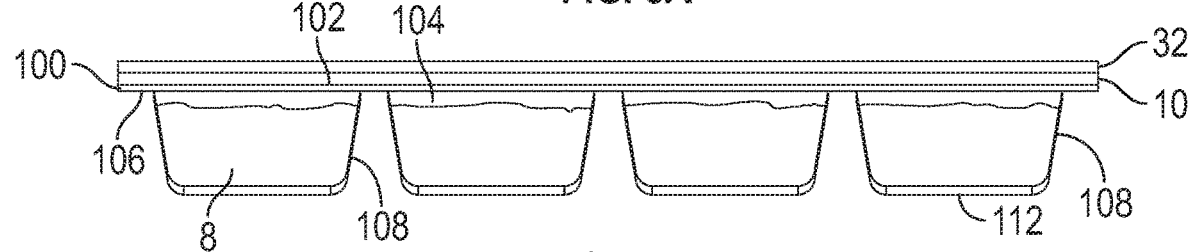
Figure 3C:
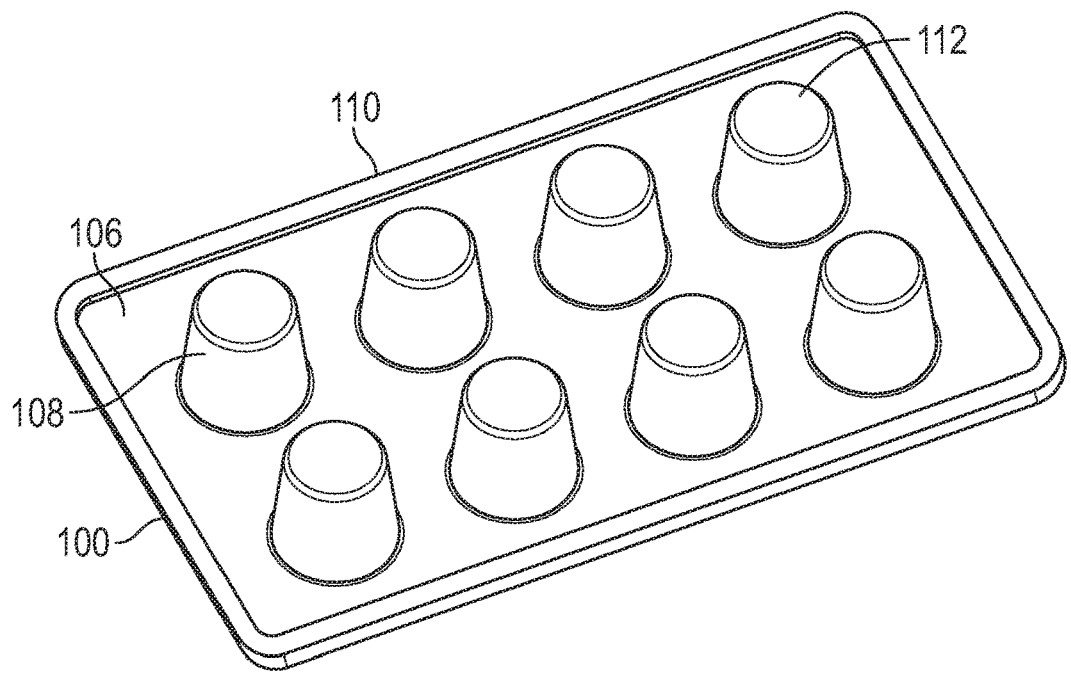
Figure 3D:
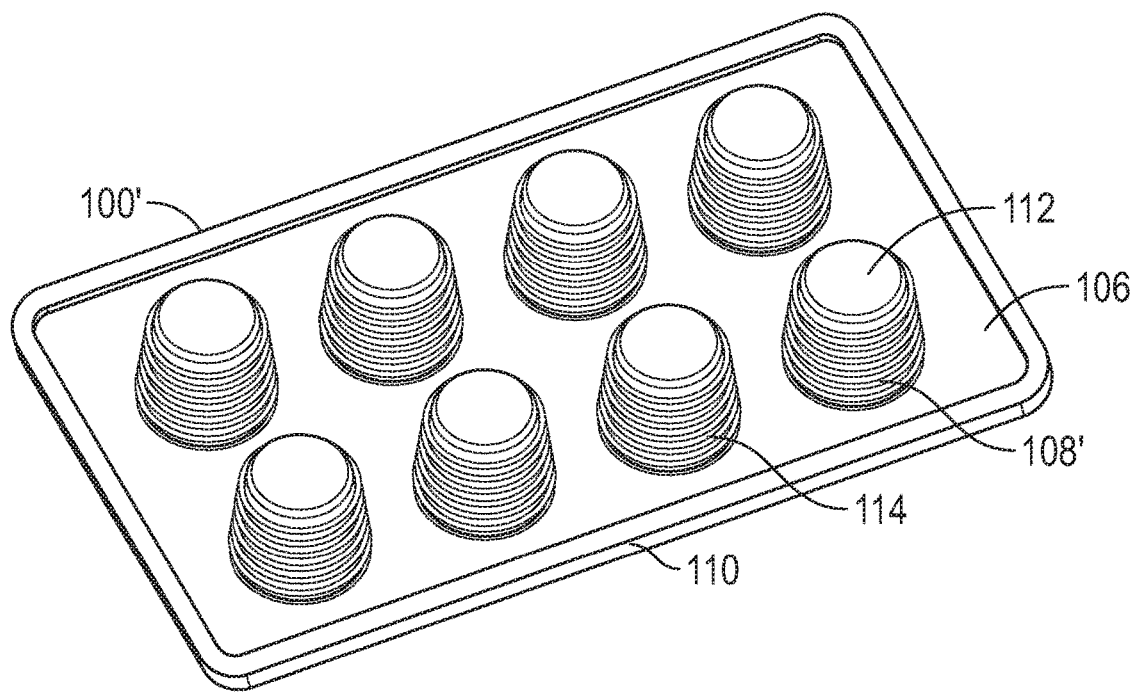
Figure 3E:
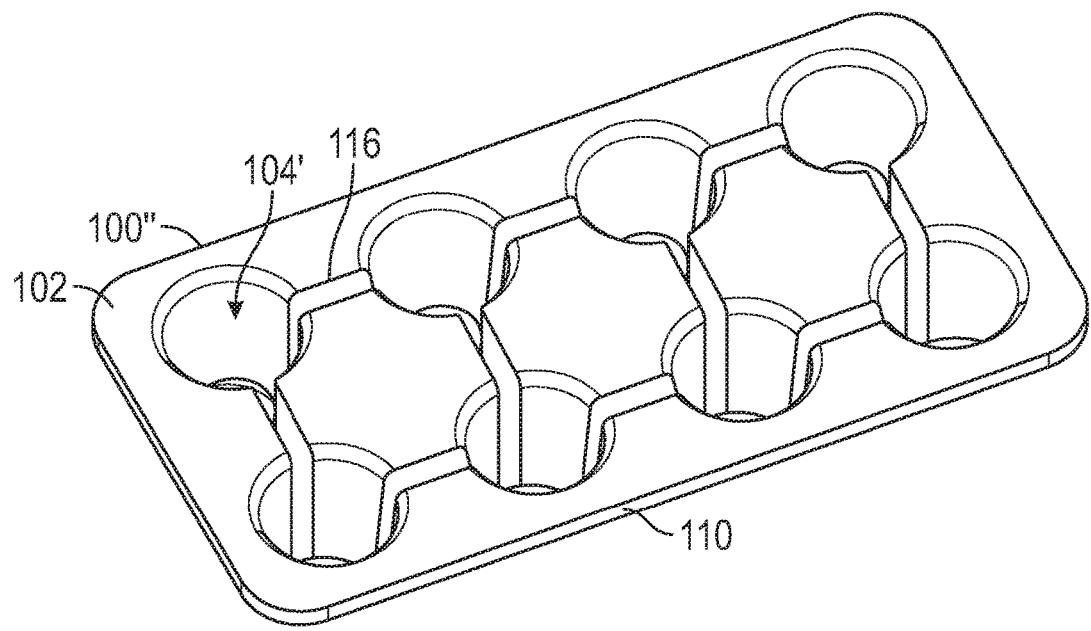
Figure 3F:
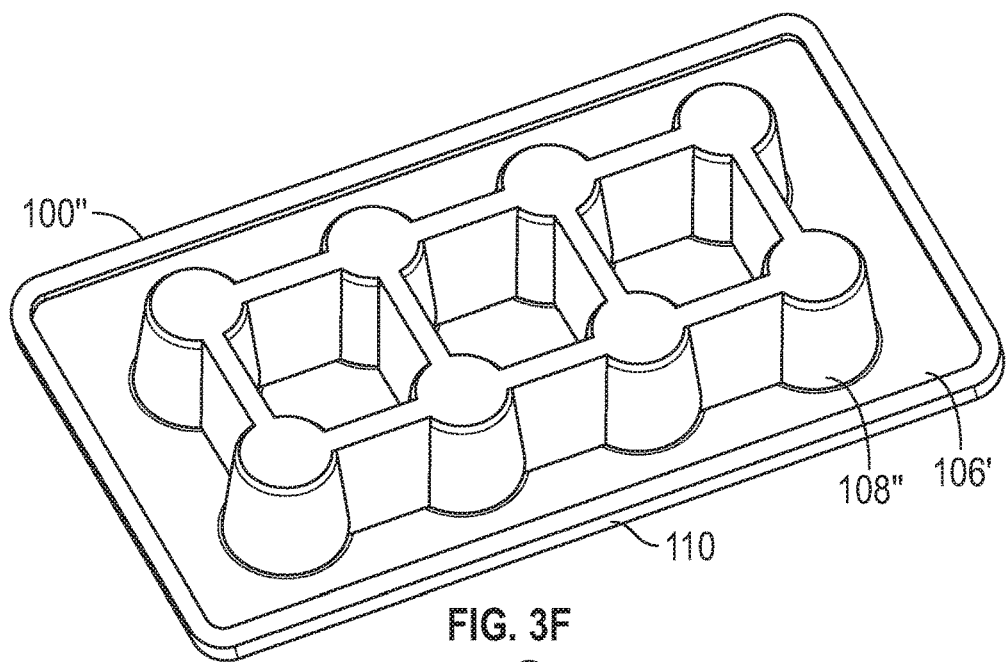
Figure 3G:
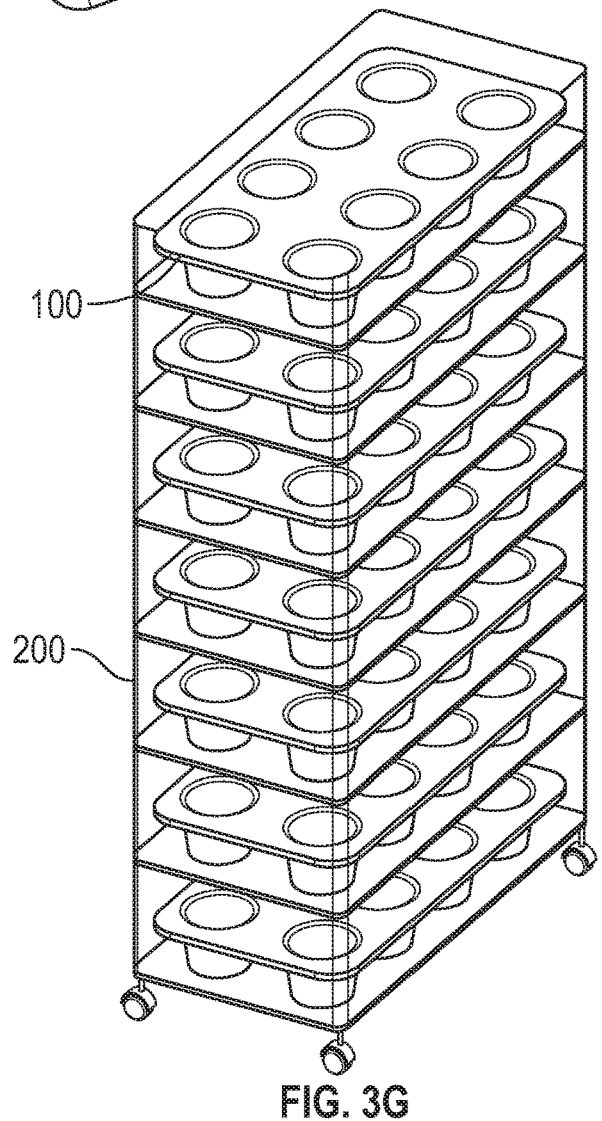
Figure 3H:
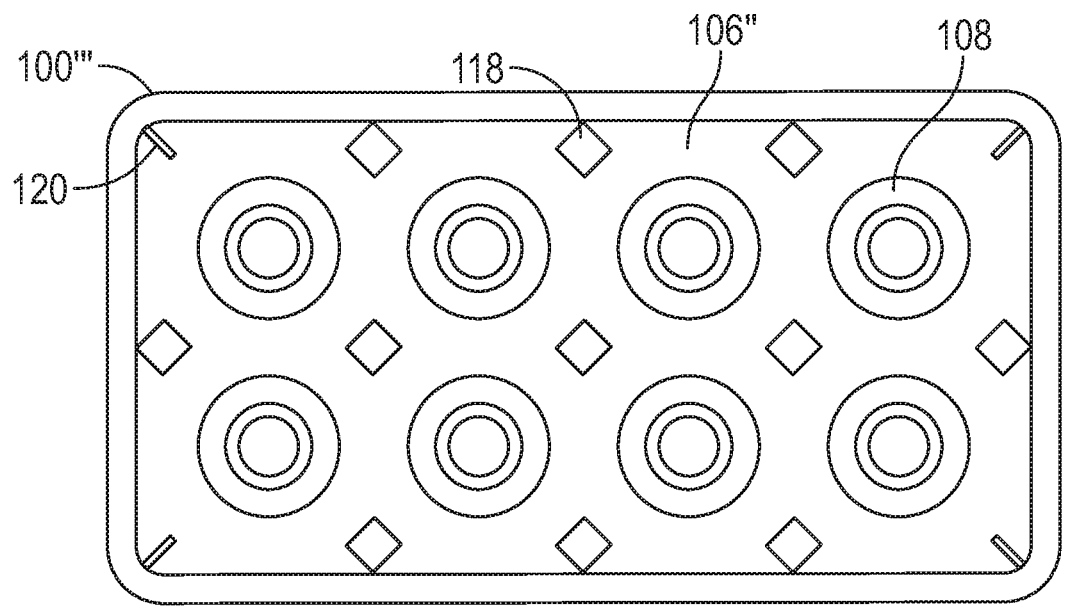
Figure 3I:
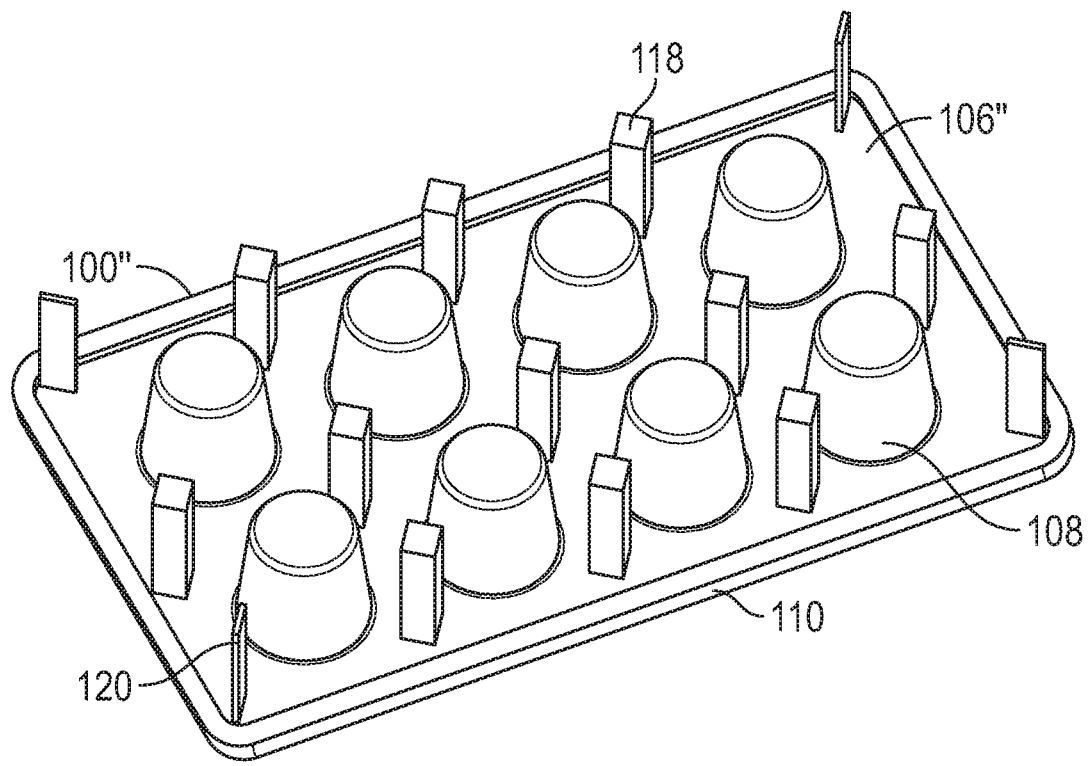
Figure 3J:
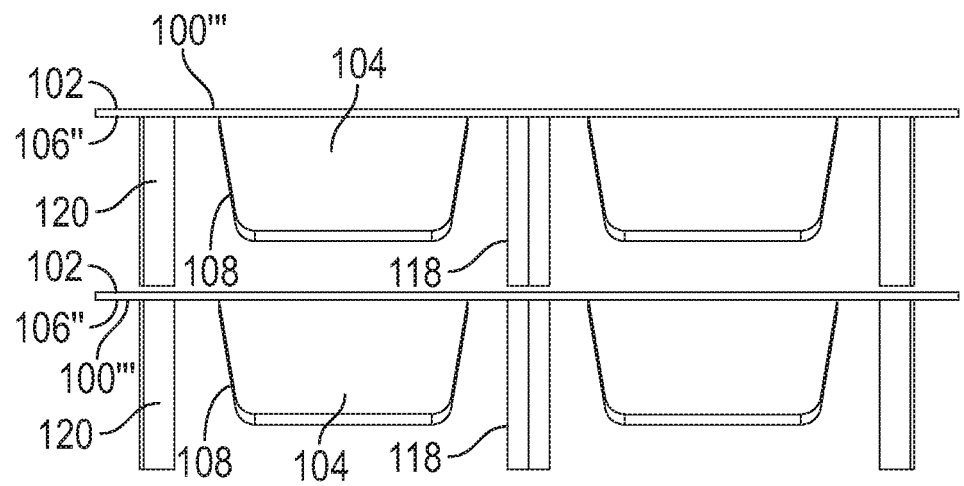
Figure 3K:
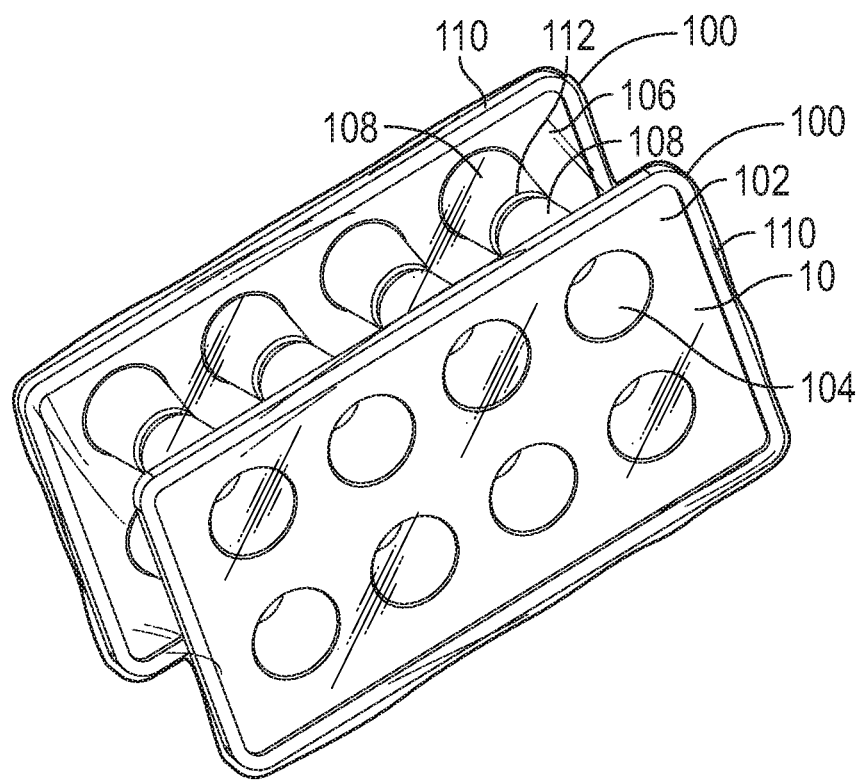
Figure 3L:
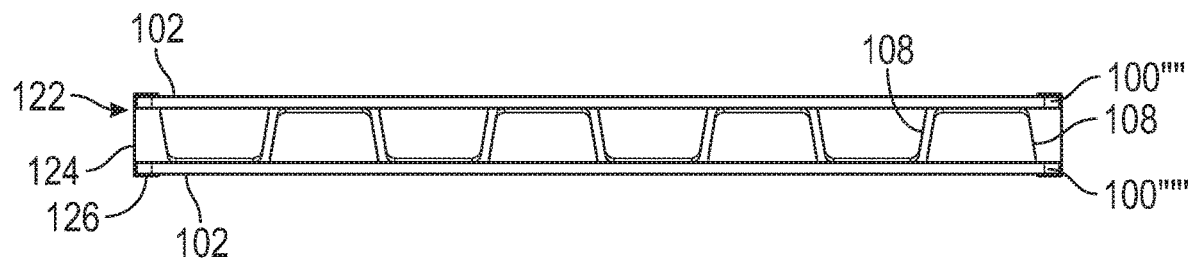
Figure 3M:
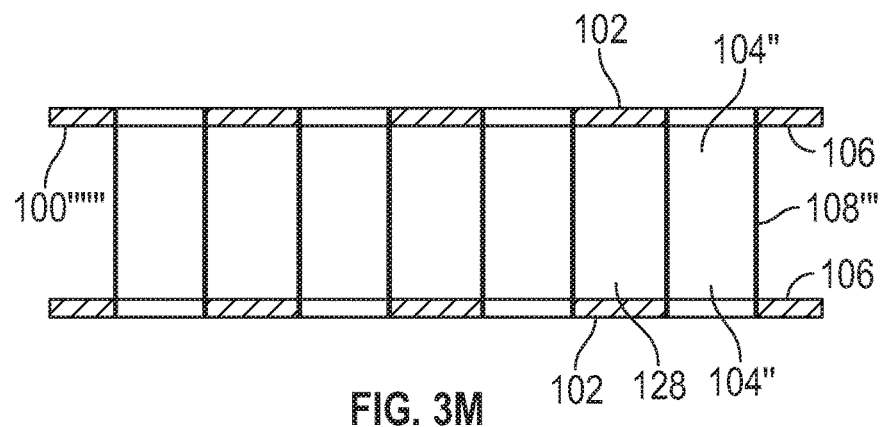
Figure 3N:
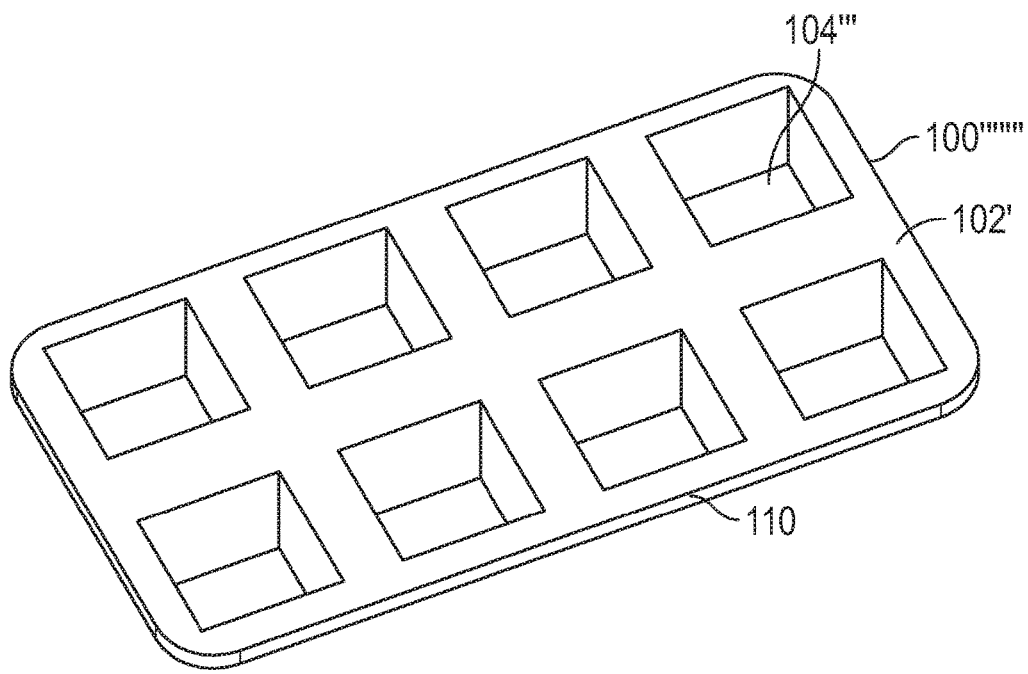

A more complete understanding of the abovementioned and other features and advantages of the present invention will be apparent from the following detailed description of preferred embodiments in conjunction with the appended drawings, wherein:

FIGS. 1A and 1B show a first embodiment of the method of producing mushrooms according to the first aspect of the present invention, FIGS. 1A and 1C show a second embodiment of the method of producing mushrooms according to the first aspect of the present invention, FIG. 2A-2C show an alternative pasteurisation or sterilisation step, an alternative harvesting step, and an alternative purging step, which may be used in the method of producing mushrooms according to the first aspect of the present invention, FIG. 3A-3C show different views and components of a first embodiment of a device for producing mushrooms according to the second aspect of the present invention, FIG. 3D shows a bottom perspective view of an alternative embodiment of a tray of an alternative embodiment of a device for producing mushrooms according to the second aspect of the present invention, FIG. 3E-3F show different views of a further alternative embodiment of a tray of a further alternative embodiment of a device for producing mushrooms according to the second aspect of the present invention, FIG. 3G shows how a plurality of devices for producing mushrooms according to the second aspect of the present invention being arranged in a stand for handling, FIG. 3H-3J show different views of a further alternative embodiment of a tray of a further alternative embodiment of a device for producing mushrooms according to the second aspect of the present invention, FIG. 3K shows a perspective view of an embodiment of a device for producing mushrooms according to the second aspect of the present invention in which two trays are arranged back to back, FIG. 3L shows a side view of an alternative embodiment of a device for producing mushrooms according to the second aspect of the present invention in which two trays are arranged back to back, FIG. 3M shows a cross sectional view of an alternative embodiment of a tray of an alternative embodiment of a device for producing mushrooms according to the second aspect of the present invention, and FIG. 3N shows a perspective top view of an alternative embodiment of a tray of an alternative embodiment of a device for producing mushrooms according to the second aspect of the present invention.

In the figures and the description the same reference numeral is used to refer to the same feature. One or more ' added to a reference numeral indicates that the feature so referenced has a similar function, structure or significance as the feature carrying the reference numeral without the', however not being identical with this feature.

Further, a subscript numeral added to a reference numeral indicates that the feature so referenced is a further one of the feature carrying the reference numeral without the subscript numeral.

FIGS. 1A and 1B show a first embodiment of the method of producing mushrooms according to the first aspect of the present invention.

In a first step of providing a tray, represented by the bracket designated the reference numeral 1, a tray, designated the reference numeral 100, is provided. This tray may preferably be provided from a stack of trays in a suitable container or cabinet 2 capable of storing the trays 100 and from which the trays may be obtained. In this step a tray 100 is thus provided by being retrieved from the cabinet 2 and placed on a conveyor 4, as indicated by the arrow designated the reference sign A, or similar device allowing the tray to be moved through the different steps of the method. Trays used in the method are generally easy to handle automatically by robots or other material handling devices known to a person skilled in the art.

In a second step of filling, represented by the bracket designated the reference numeral 3, the retrieved tray 100 which, as will be further described in FIG. 3A, comprises a generally planar first surface 102 with a plurality of receptacles 104 formed in it, is positioned at dispensing device 6, the dispensing device 6 filling each of the receptacles 104 with a mushroom growth medium 8 suitable for the type of mushroom that is to be produced.

In a third step of closing each receptacle, represented by the bracket designated the reference numeral 5, a foil or sheet 10 is dispensed from a roll 12 via a press roller 14 and applied to the first surface 102 of the tray 100 to seal or close the receptacles 104. The foil or sheet 12 may be provided with an adhesive in order to cause it to adhere to the first surface, or, as shown here, a heater 16 is used to heat the foil as it is applied to the first surface, causing it to partially melt and therefore, when cooling, adhering to the first surface. By the steps 1, 3 and 5 a device (100, 10, 8) for producing mushrooms, comprising the tray 100 with the mushroom growth medium 8 and the foil or sheet 10, is obtained.

Before mushroom spawn can be inoculated into the growth medium 8 in the receptacles 104, the growth medium 8 should be pasteurized or sterilized to ensure that no other organism, such as other fungal or bacterial organisms will grow and affect the production of the desired mushroom in the growth medium 8.

Although it is possible to perform steps 1, 3 and 5 under aseptic conditions, such as by storing sterilised trays 100 under sterile conditions, filling the receptacles 104 with a sterile growth medium 8, for example by heating the growth medium 8 before filling it into the receptacles, and adhering a sterile foil or sheet 10 to the trays 100, generally a fourth step of pasteurising or sterilising of the growth medium 8 is required. Here an advantageous effect of the method and device according to the aspects of the present invention is evident as the growth medium 8 can be sterilized while in the tray 100 and that the foil or sheet 10 seals the receptacles so that once sterilised, any competitive microorganism or other substances cannot reach the growth medium 8 from outside the tray 100 or device (100, 10, 8). This pasteurisation or sterilisation step is indicated by the bracket designated the reference numeral 7 and involves collecting the devices (100, 10, 8) after the third step 5, as indicated by the arrow designated the reference sign B, and arranging them so that a heating medium, here heated gaseous medium such as heated air or steam, can be directed to the outsides of the receptacles 104. Thus the trays 100 are stacked, either directly on top of each other as described further below, or by being placed on suitable shelves or ledges of a stand or carousel as shown in FIG. 3G, whereafter heated air 18 is directed between the trays towards the outer surfaces of the projections corresponding to the receptacles 104 from a manifold 20, the air being heated in a heating element and heating chamber 22, to which the air 18 is supplied by a fan unit 24. The time needed for pasteurization depends on the temperature and volume flow of the heated air, as well as on the configuration, volume and number of receptacles 104 in the trays 100.

After the pasteurisation or sterilisation step 7, the trays 100 are ready for inoculation. Thus in a fifth step 9 (inoculation step) a device (100, 10, 8) is taken, as indicated by the arrow designated the reference sign C, from the stack of devices undergoing pasteurization or sterilisation and placed on a conveyor 26 bringing it in position beneath an injection unit 28 comprising a plurality of injection needles 30 which, as the injection unit is activated, move down to pierce the foil or sheet 10 over the respective receptacles 104 for injecting mushroom spawn into the growth medium 8 of each of the receptacles 104.

The holes resulting from piercing the foil or sheet 10 may generally be left open after the injection unit 28 withdraws the injection needles 30, however, if desired, an optional $6^{th}$ step (sealing step), indicated by the bracket designated the reference numeral 11, applies a second layer of a foil or sheet 32 from a roll 34 via a press roller 36, the foil or sheet 32 being caused to adhere using heat from a heater 38.

The second layer of foil or sheet 32 may be provided with a ventilation filter, i.e. there may be provided one or more apertures in the foil or sheet, which apertures are sealed by a filter allowing air to pass through but preventing microorganisms from entering the receptacles.

As the growth medium 8 has been inoculated, the $7^{th}$ step, i.e. the incubation step, as indicated by the bracket designated the reference numeral 13, ensues, in which the devices (100, 10, 8) are collected, as indicated by the arrow designated the reference sign D, and placed in an incubator, for example by being stacked directly on top of each other or positioned in a stand or carousel, see now FIG. 1B. During the incubation step 13 the mushroom spawn injected in the inoculation step 8 starts to grow to form mushroom mycelium 40 in the growth medium 8 in the receptacles 104. Once the mushroom mycelium 40 is sufficiently developed the receptacles need to be at least partially opened to the atmosphere. Accordingly, in the $8^{th}$ step i.e. the step of at least partially removing or opening the foil or sheet indicated by the bracket assigned the reference numeral 15, the devices (100, 10, 8) are retrieved as indicated by the arrow designated the reference sign E and conveyed by conveyor 42 past a perforating wheel 44 which perforates and at least partly removes the one or two layers of foil or sheet 10 (32) covering the receptacles 104, for example by partly breaking the foil or sheet such as by cross cutting or puncturing. Following this the devices (100, 10, 8) are passed, as indicated by the arrow designated the reference sign F, to a fruitification step, i.e. the $9^{th}$ step as indicated by the bracket assigned the reference numeral 17, in which mushrooms 46 grow from the mushroom mycelium 40 in the receptacles 104 to protrude out of the receptacles through the areas where the foil or sheet was removed or broken by the perforating wheel 44.

Once the mushrooms 46 growing out of each tray 100 has grown to the desired size, it is time for the harvesting step, i.e. the $10^{th}$ step indicated by the bracket assigned the reference numeral 19. In this step the tray 100 is retrieved, as indicated by the arrow designated the reference sign G, and placed on a conveyor 48 and moved under a knife 50 aligned along the first surface 102 so that the movement of the tray 100 causes the knife to cut off the mushrooms 46, which fall onto a collecting surface 52 from which they are removed, for example as illustrated here by suction using a hose 54 arranged in proximity to the collecting surface 52.

The trays 100 now contain, in its receptacles 104, the spent growth medium 8 and the mushroom mycelium 40. In order to be able to reuse the tray 100 to produce more mushrooms a removing step uses a pressurized medium, here water 56 but air is also suitable, that is ejected from a nozzle 58 and directed into the receptacles 104 to purge the remaining growth medium 8 from the receptacles 104, in a purging step indicated by the bracket designated the reference numeral 21. The water may for example also be heated so as to also wash way the layer(s) of foils or sheets 10, 32 on the first surface 102 on the tray 100, however, depending on the number of times the tray 100 can be reused this need not be necessary as the thickness of the foil or sheet 10 and 32 is generally so small that even if the tray 100 comprises several layers of foil or sheet 10, 32, no disadvantages are expected in the first step 1 of the method. The trays 100 thus purged of growth medium 8 and mushroom mycelium 40 are then passed to the storage 2 in step 1 for reuse in the method, as indicated by the arrow designated the reference sign H.

FIGS. 1A and 10 show a second embodiment of the method of producing mushrooms according to the first aspect of the present invention. This embodiment differs from the embodiment shown in FIGS. 1A and 1B in that it uses trays arranged back to back to further increase the production capacity of the method shown in FIGS. 1A and 1B.

As shown, this embodiment employs the same steps up to and including the $6^{th}$ step 11, whereafter devices (100, 10, 8)

are arranged two and two in an assembling step as indicated by the bracket designated the reference numeral 11' in FIG. 10.

The devices (100, 10, 8) may be arranged back to back horizontally, i.e. by inverting a first tray 100 to direct its first surface 102 downwards and arranging a second tray 1001 on top of the first tray 100 as shown in step 11'. Alternatively (not shown) devices (100, 10, 8) are alternatively rotated 90 degrees clockwise and anti-clock wise, seen in the direction of travel on the conveyor 4, so that that they can be arranged back to back. After being assembled back to back the trays may be fastened together by adhesive applied to the bottom of the receptacles 104, or by wrapping the combined trays with the foil or sheets used in step 5 or 11.

Hereafter the steps of the first embodiment are carried out modified to take into account that the devices are arranged two and two back to back.

Thus a modified incubation step 13' see the mycelium 40 develop inside the receptacles 104.

A modified step of at least partially removing or opening the foil or sheet 15' is here shown carried out with the devices (100, 10, 8) arranged standing on their side, the view showing the top of the conveyor 42, so that dual cutting wheels 44, arranged on either side of the conveyor 42, can cut the foil or sheets 10, 32 to partially open the receptacles 104.

A modified fruitification step 17' then sees the devices (100, 10, 8) being stored on their sides as mushrooms 46 start to grow out of the receptacles.

A modified harvesting step then sees the devices (100, 10, 8) being carried on their sides on the top of a conveyor 48. Two modified knifes 50' are arranged to cut off the mushrooms 46 as the devices (100, 10, 8) pass between the knifes 50'. The mushrooms 46 that are cut off fall down onto the conveyor 48 and are pushed to the edges of the conveyor 48 by modified collecting surfaces 52'. The mushrooms 46 then fall off the conveyor 48 by the force of gravity into collection tubes 54'.

A modified purging step 21' then sees the nozzles 58 being duplicated to simultaneously purge spent mushroom growth medium 8 with the mycelium 40 from corresponding receptacles 104 of the two devices arranged back to back using water or air 56.

FIG. 2A-2C show an alternative pasteurisation or sterilisation step, an alternative harvesting step, and an alternative purging step, which may be used in the method of producing mushrooms according to the first aspect of the present invention. Accordingly FIG. 2A shows an alternative embodiment of the 4$^{th}$ step, the pasteurization or sterilization step, as indicated by the bracket assigned the reference numeral 7'. This alternative step comprises a first substep in which a heating medium, such as steam 60, is directed from a manifold or nozzle assembly 62 supplied from a source of steam or heating medium 64 at the devices (100, 10, 8) and in particular the outsides of the receptacles 104 to heat the growth medium 8 to a temperature suitable for pasteurization or sterilization, and to keep the growth medium 8 at this temperature for the time needed to obtain the desired pasteurization or sterilization.

This substep may be followed by the optional substep of directing a cooling medium, such as cold water 66 from a manifold or nozzle assembly 68 supplied by a source of cold water 70, onto the tray 100 and in particular the outsides of the receptacles 104 to cool the growth medium to a temperature at which the mushroom spawn injected in the inoculation step can survive, unless the speed of the conveyor 4 is sufficiently slow so that the growth medium 8 cools spontaneously before arriving at the injection unit 28.

Accordingly FIG. 2B shows an alternative embodiment of the 10$^{th}$ step, the harvesting step, as indicated by the bracket assigned the reference numeral 19".

Here the knife 50 is replaced by a thin wire 50" arranged across the device (100, 8) so as to cut of the mushrooms 46 as the tray 100 passes under the wire 50". A modified collecting surface 52" collects the mushrooms to funnel them into a modified collection tube 54".

It should be noted that no foils or sheet 10, 32 are shown in FIG. 2B. These can instead of being cut open or partially removed as shown in step 15, also generally be completely removed before the harvesting step 19, 19', 19" by for example grasping one edge of the foils or sheets and peeling them off.

Accordingly FIG. 2B shows an alternative embodiment of the 11$^{th}$ step, the purging step, as indicated by the bracket assigned the reference numeral 21".

Here the nozzles 58 have been replaced by a rotating brush 58' which enter the receptacles to physically remove the spent growth medium 8 with the mycelium 40. A suction pipe integrated with brushes can be used for collecting the spent growth medium.

FIG. 3A-3C show different views and components of a first embodiment of a device for producing mushrooms according to the second aspect of the present invention. Accordingly FIGS. 3A-3C show various views of the tray 100 shown in FIGS. 1 and 2 in more detail. The tray 100, in addition to the first surface 102, the depressions defining the receptacles 104, further comprises a second surface 106 opposite the first surface 102, and from which the depressions 104 formed in the first surface 102 project as projections 108 defining the outer walls 108 of the receptacles 104. The edge 110 of the trays may be reinforced by using a thicker material or by folding the edge as seen here.

The bottom of the projections 108 are designated the reference numeral 112. The receptacles 104 are typically shaped frustoconically, as shown here but may alternatively be shaped cylindrically, or cubically.

FIG. 3B shows the device (100, 10, 8) after step 11.

The radius of the receptacles may be 5 cm, corresponding to a 10 cm diameter or side for receptacles which are circular or square. The height, i.e. the depth, of the receptacles may be 10 cm.

The tray 100 is preferably configured to be stackable, so that a plurality of trays 100 can be arranged with the projections 108 of one tray entering the receptacles 104 of an adjacent tray 100.

The tray 100 is preferably made from transparent plastic so that the growth of the mycelium 40 in the growth medium 8 can be observed.

FIG. 3D shows a bottom perspective view of an alternative embodiment of a tray 100' of an alternative embodiment of a device for producing mushrooms according to the second aspect of the present invention. On the underside 106 of tray 100' modified protrusion 108' are shown being provided with annular radial fins 114, these fins preferably being integrally moulded with the tray 100' and having the purpose of increasing the surface area of the protrusions so as to increase the rate of heat transfer into the growth medium 8 in the receptacles 104, to thereby decrease the time needed in the pasteurisation or sterilisation step 7. The fins 114 may alternatively be arranged axially, i.e. in the direction of the axis of the receptacles 104. Such an orientation could render the manufacturing to the tray 100' easier, but could cause more disturbance and resistance to flow for the heating medium 18 during the pasteurisation or sterilisation step 7.

FIG. 3E-3F show different views of a further alternative embodiment of a tray 100" of a further alternative embodiment of a device for producing mushrooms according to the second aspect of the present invention. Tray 100" is provided with receptacles 104' which are in fluid connection with each other via channels or troughs 116. For some mushroom varieties tray 100" provides an advantage in that the mycelium 40 in one receptacle 104' is able to grow into neighbouring receptacles 104' via the troughs 116, thus providing the mycelium a larger volume of growth medium 8. The channels or troughs 116 may as here have the same depth as the receptacles 104', but may also be shallower, the latter causing less disturbance and resistance to flow for the heating medium 18 during the pasteurisation or sterilisation step 7.

FIG. 3G shows how a plurality of devices (100, 10, 8) for producing mushrooms according to the second aspect of the present invention being arranged in a stand 200 for handling for example during the pasteurization step 7 and the incubation and fruitification steps 13 and 17. The stand 200 may be loaded with the devices, and unloaded, automatically or manually.

FIG. 3H-3J show different views of a further alternative embodiment of a tray 100''' of a further alternative embodiment of a device for producing mushrooms according to the second aspect of the present invention. Tray 100''' is provided with a modified second surface 106" provided with guide vanes 118 and 120 for controlling the flow of hot air or gas towards the projections 108 during the pasteurization step 7. These guide vanes 118 and 120 may further serve as distance elements allowing the trays 100''' to be stacked on top of each other. If the trays 100''' are formed with these guide vanes 118, 120 being open to first surface 102, then the sealing of the receptacles 104 by the sheet or foil 10, 32 may also seal the openings to the guide vanes 118, 120 in the first surface 102, thus providing a flat surface on which the tips of the guide vanes of a tray 100''' arranged above in a stack may be supported from, as shown in FIG. 3J. Alternatively the trays may be stacked without guide vanes 118, 120 or the stand 200 by allowing the bottom 112 of the receptacles 104, i.e. the bottom 112 of the projections 108, of each tray 100 be supported by the foil or sheet 10, 32 closing the receptacles 104 of a tray arranged lower in the stack. In either case hot air or gas is able to pass between the trays and between the receptacles 104, to heat the growth medium 8 in the receptacles 104.

FIG. 3K shows a perspective view of an embodiment of a device for producing mushrooms according to the second aspect of the present invention in which two trays 100 are arranged back to back with the bottoms 112 of each tray's projections 108 contacting. The trays may be joined together by adhesive applied to the bottoms 112, or as shown in FIG. 3K by wrapping a further layer of the same or similar foil or sheet 10, 32 that is used to close the receptacles 104 around both trays 100.

FIG. 3L shows a side view of an alternative embodiment of a device for producing mushrooms according to the second aspect of the present invention in which two trays 100"" and 100""" are arranged back to back, but where the position of the receptacles/projections 104, 108 on respective tray 100"", 100""" is arranged so that the projections 108 of one 100"" of the trays extend between the projections 108 of the other tray 100""". This decreases the thickness of the combination of the two trays 100"" and 100""" and may therefore be advantageous if the volume of the space used for the steps of pasteurization or incubation 13 and fruitification 17 is limited. The trays 100"" and 100""" are here shown held together by elastic clips or brackets 122 comprising a main body 124 and two spaced a part opposed hooks or clamps 126 which engage the first sides 102 of the respective trays to hold the trays together.

FIG. 3M shows a cross sectional view of an alternative embodiment of a tray 100""" of an alternative embodiment of a device for producing mushrooms according to the second aspect of the present invention. Here two trays are formed integrally with each other and each receptacle 104" of the first one of the two trays is in fluid communication with a corresponding receptacle of the second one of the two trays. Spaces 128 between the projections 108''' defined by the receptacles 104" provide passage for hot air or gas for heating the growth medium 8 in the receptacles 104". The tray shown in FIG. 3M has the advantage that it can be inoculated from both sides, thus providing efficient production of mushroom in a small volume. Further, the tray is also easily purged of spent growth medium 8 as the removal of the foil or sheet covering the receptacles allows pushing the spent growth medium out of the receptacles in a single direction.

FIG. 3N shows a perspective top view of an alternative embodiment of a tray 100""" of an alternative embodiment of a device for producing mushrooms according to the second aspect of the present invention having a modified first surface 102' in which the receptacles 104''' are of square cross section, thus providing projections with a larger surface area for increased volume of the receptacles and increased heat transfer from the hot air or gas for heating the growth medium 8 in the receptacles 104'''.

EXAMPLE

Cultivation of Shiitake (*Lentinula edodes*), Oyster Mushroom (*Pleurotus ostreatus*), and King Oyster Mushroom (*Pleurotus eryngii*)

In the example, trays according to the present invention were made of Polystyrene (PS) or Polypropylene (PP), with 5×2 receptacles each. The general dimensions of the trays were 56×25 cm. Each receptacle had a diameter of about 10 cm at the opening (at the first surface) and 9 cm at the bottom (at second surface) and was 8-10 cm in depth. The total volume of the receptacles was about 4 litres. For each tray about 2.5 kg, corresponding to about 4 litres, of growth medium (substrate) was used to fill the receptacles. The growth medium was composed of water (65%), birch sawdust/chips (28%), wheat bran (7%) and CaCO3 (0.4%). Immediately after filling the growth medium, a sheet of transparent plastic food wrap (the foil or sheet) was placed over the first surface and the openings of the receptacles to seal the receptacles. Pasteurisation was then performed in a chamber where hot-air of 85° C. was circulated. The pasteurisation took 4-5 hours, after which the pot tray was moved into a pre-disinfected room/chamber with ventilation for cooling. When the temperature of the tray was below 30° C., then the first sheet of plastic wrap above each receptacle was punched to an opening or cut in a cross, under a sterile hood, and then inoculum ("spawn") of either solid grain or liquid form was injected into each receptacle. Upon an accomplishment of inoculation, the openings for inoculation were immediately covered/sealed either by individual patches of a filter material, i.e. one patch for each opening, continuous strips of the filter material covering multiple receptacles, or by a single sheet of food wrap (further sheet or foil) applied to and covering the entire first surface of the tray. The filter material keeps contaminant microbes out of the receptacles while permitting air exchange. Some trays were also covered by a modified second sheet of food wrap in which strips of filter material had been inserted. The inoculated growth medium was then subjected to incubation for about 60-70 days in a room with temperature of 22-24° C. and relative humidity of approximately 70%. When fruit bodies appeared and developed to a size of 1-2 cm, the food wrap sheets were removed. The growth medium was then exposed in an environment with a temperature of 16-18° C., relative humidity of >90% and light of 500-1000 lux. Alternatively, for some trays, the sheet(s) of food wrap (and filter material if present) was only partially removed. This was obtained by cross cutting the sheet of food wrap (and filter material if present) over each receptacle. In both cases, i.e. full removal of the sheets and partial removal, respectively, mushrooms (fruit bodies) grew to a suitable size for harvesting and consumption.

For shiitake a harvest of first-flush (i.e. the first wave of appearance of mushroom fruit bodies) yielded up to 630 g fruit bodies (fresh weight) per kg dry mass of initial growth medium, or a biological efficiency of 63%.

The method was also performed for oyster mushroom (*Pleurotus ostreatus*) and king oyster mushroom (*Pleurotus eryngii*) with good results.

In a variant of the above two trays were placed back to back one month after being inoculated and covered by the second sheet, i.e. similar to FIG. 10. Oyster mushroom (*Pleurotus ostreatus*) was produced with good results using this variant.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. A method of producing mushrooms, comprising the steps of:
   i. providing a tray having a planar first surface and an opposite second surface and comprising a plurality of spaced apart depressions in the first surface, inner surfaces of the depressions defining receptacles open to the first surface for holding a mushroom growth medium and the outer surfaces of the depressions defining protrusions extending out from the second surface,
   ii. filling each receptacle at least partially with a mushroom growth medium, and
   iii. closing each receptacle by applying a foil or sheet to the first surface,
   iv. pasteurizing or sterilising the mushroom growth medium by applying a pasteurization or sterilisation heating medium, including one or more of heated gas and heated air, to the tray by allowing the heating medium to pass between the protrusions of the receptacles on the second surface of the tray,
   v. inoculating the mushroom growth medium with mushroom spawn by injecting the mushroom spawn through the foil or sheet into the mushroom growth medium,
   vi. incubating the mushroom growth medium for allowing a mushroom mycelium to form in the mushroom growth medium,
   vii. at least partially removing or opening the foil or sheet closing the receptacles to allow mushrooms to grow and protrude from the receptacles and from the first surface, and
   viii. harvesting the mushrooms.

2. The method according to claim 1, wherein step iii of closing each receptacle comprises one or more of:
   heating one or more of the foil or sheet and the first surface to partially melt the foil or sheet to cause the foil or sheet to adhere to the first surface, and
   using an adhesive applied to one or more of the foil or sheet and the first surface.

3. The method according to claim 1, wherein step viii of harvesting the mushrooms comprises moving a knife parallel with, and along the first surface to sever at least a part of the mushrooms protruding from the first surface from one or more of a part of the mushrooms in the receptacles and the mycelium in the mushroom growth medium.

4. The method according to claim 1, further comprising the step of:
   ix. removing, after step viii of harvesting, the mushroom growth medium with the mushroom mycelium from the receptacles of the tray by applying a physical force or by blowing a gas or spraying a liquid on the mushroom growth medium and reusing the tray in step i.

5. The method according to claim 1, wherein in step i two trays are provided, the method further comprising the steps of:
   x. arranging and fastening the two trays back to back in pairs with respective first surfaces facing away from each other,
   and further wherein:
   a. bottoms of receptacles of a first one of the two trays contact bottoms of receptacles of a second one of the two trays,
   or
   b. an alignment or positioning of receptacles a first one of the two trays in relation to receptacles of a second one of the two trays, in combination with dimensions of the receptacles of the first and second trays, are configured so that protrusions of the first one of the two trays extend between protrusions of the second one of the two trays so that the protrusions of the first one of the two trays contact a second surface of the second one of the two trays, and each of the steps ii to viii, and step ix, is performed on both of the two trays sequentially or simultaneously.

6. The method according to claim 1, wherein in step i two trays are provided, the two trays being formed integrally with each other whereby each receptacle of a first one of the two trays is in fluid communication with a corresponding receptacle of a second one of the two trays, and wherein each of the steps ii to viii, and step ix, is performed on both of the two trays sequentially or simultaneously.

7. A device for producing mushrooms, the device comprising:
- a tray having a planar first surface and an opposite second surface and comprising a plurality of depressions in the first surface, inner surfaces of the depressions defining receptacles open to the first surface for holding a mushroom growth medium and outer surfaces of the depressions defining protrusions extending out from the second surface, the tray being made of a non-transparent plastic comprising polypropylene,
- a mushroom growth medium provided in the receptacles, the mushroom growth medium being pasteurized or sterilised, and
- a foil or sheet applied to the first surface so as to close each receptacle.

8. The device according to claim 7, wherein the second surface or the protrusions further comprise guiding vanes or fins for one or more of guiding a pasteurization or sterilisation heating medium, including one or more of heated gas and air towards the protrusions and increasing a surface area of the protrusions to increase a rate of heat transfer from the pasteurization or sterilisation heating medium to the receptacles.

9. The device according to claim 7, wherein a bottom of each receptacle is made up of a foil or sheet attached to one or more of the second surface and the protrusions extending out of the second surface.

10. The device according to claim 7, comprising two trays arranged back to back, with respective first surfaces facing away from each other and wherein bottoms of receptacles of a first one of the two trays contact bottoms of receptacles of a second one of the two trays.

11. The device according to claim 7, comprising two trays arranged back to back, wherein an alignment or positioning of receptacles of a first one of the two trays in relation to receptacles of a second one of the two trays, in combination with the dimensions of the receptacles of the first and second trays, are configured so that protrusions of the first one of the two trays extend between protrusions of the second one of the two trays so that the protrusions of the first one of the two trays contact a second surface of the second one of the two trays.

12. The device according to claim 10, wherein the foil or sheet is attached to a respective first surface of the two trays and further extends between the two trays to keep the two trays arranged back to back, with each respective first surface facing away from each other.

13. The device according to claim 10, wherein the two trays are formed integrally with each other and wherein each receptacle of the first one of the two trays is in fluid communication with a corresponding receptacle of the second one of the two trays.

* * * * *